United States Patent
Coppola et al.

(10) Patent No.: US 10,113,651 B2
(45) Date of Patent: Oct. 30, 2018

(54) SLIT VALVE ASSEMBLY HAVING A SPACER FOR MAINTAINING A GAP

(71) Applicant: Parker-Hannifin Corporation, Cleveland, OH (US)

(72) Inventors: Stephen Coppola, Boston, MA (US); Julian Kamibayashiyama, San Diego, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/257,329

(22) Filed: Sep. 6, 2016

(65) Prior Publication Data

US 2016/0377183 A1    Dec. 29, 2016

Related U.S. Application Data

(63) Continuation of application No. 14/100,930, filed on Dec. 9, 2013, now abandoned.

(60) Provisional application No. 61/734,605, filed on Dec. 7, 2012.

(51) Int. Cl.

| F16K 1/36 | (2006.01) |
|---|---|
| F16K 1/42 | (2006.01) |
| F16K 1/44 | (2006.01) |
| F16K 1/46 | (2006.01) |
| F16K 3/02 | (2006.01) |
| F16K 51/02 | (2006.01) |
| F16K 3/16 | (2006.01) |

(52) U.S. Cl.
CPC .............. *F16K 3/0236* (2013.01); *F16K 1/36* (2013.01); *F16K 1/42* (2013.01); *F16K 1/44* (2013.01); *F16K 1/46* (2013.01); *F16K 1/465* (2013.01); *F16K 3/0227* (2013.01); *F16K 3/0281* (2013.01); *F16K 3/16* (2013.01); *F16K 51/02* (2013.01)

(58) Field of Classification Search
CPC ..... F16K 1/34; F16K 1/36; F16K 1/42; F16K 1/44; F16K 1/46; F16K 1/465; F16K 3/0218; F16K 3/0227; F16K 3/0236; F16K 51/02; H01L 21/67126
See application file for complete search history.

(56) References Cited

U.S. PATENT DOCUMENTS

| 4,785,962 | A | 11/1988 | Toshima |
| 6,245,149 | B1 | 6/2001 | De Lomenie et al. |
| 6,629,682 | B2 * | 10/2003 | Duelli ............... F16K 51/02 251/158 |
| 6,685,163 | B2 | 2/2004 | Blecha |
| 6,764,265 | B2 | 7/2004 | Kunze et al. |

(Continued)

FOREIGN PATENT DOCUMENTS

| EP | 1087157 | 3/2001 | |
| WO | WO 0212766 A1 * | 2/2002 | ............... F16K 1/36 |

*Primary Examiner* — Reinaldo Sanchez-Medina
*Assistant Examiner* — Hailey K Do
(74) *Attorney, Agent, or Firm* — Renner, Otto, Boisselle & Sklar, LLP

(57) ABSTRACT

A spacer for maintaining a gap between a slit valve door and a sealing surface of a slit valve body. The spacer may be located on an outer ambient side of the slit valve away from any corrosive gasses that may exist in the chamber. The spacer may be attached to the slit valve door partially in a depression therein, and may be integral with the seal.

20 Claims, 14 Drawing Sheets

(56) References Cited

U.S. PATENT DOCUMENTS

| | | | |
|---|---|---|---|
| 7,036,790 B2 * | 5/2006 | Kajitani | F16K 31/1221 251/122 |
| 2006/0273277 A1 | 12/2006 | Heller et al. | |
| 2008/0315141 A1 | 12/2008 | Thrash | |
| 2009/0045371 A1 | 2/2009 | Kamibayashiyama | |
| 2009/0108544 A1 | 4/2009 | Sico | |

* cited by examiner

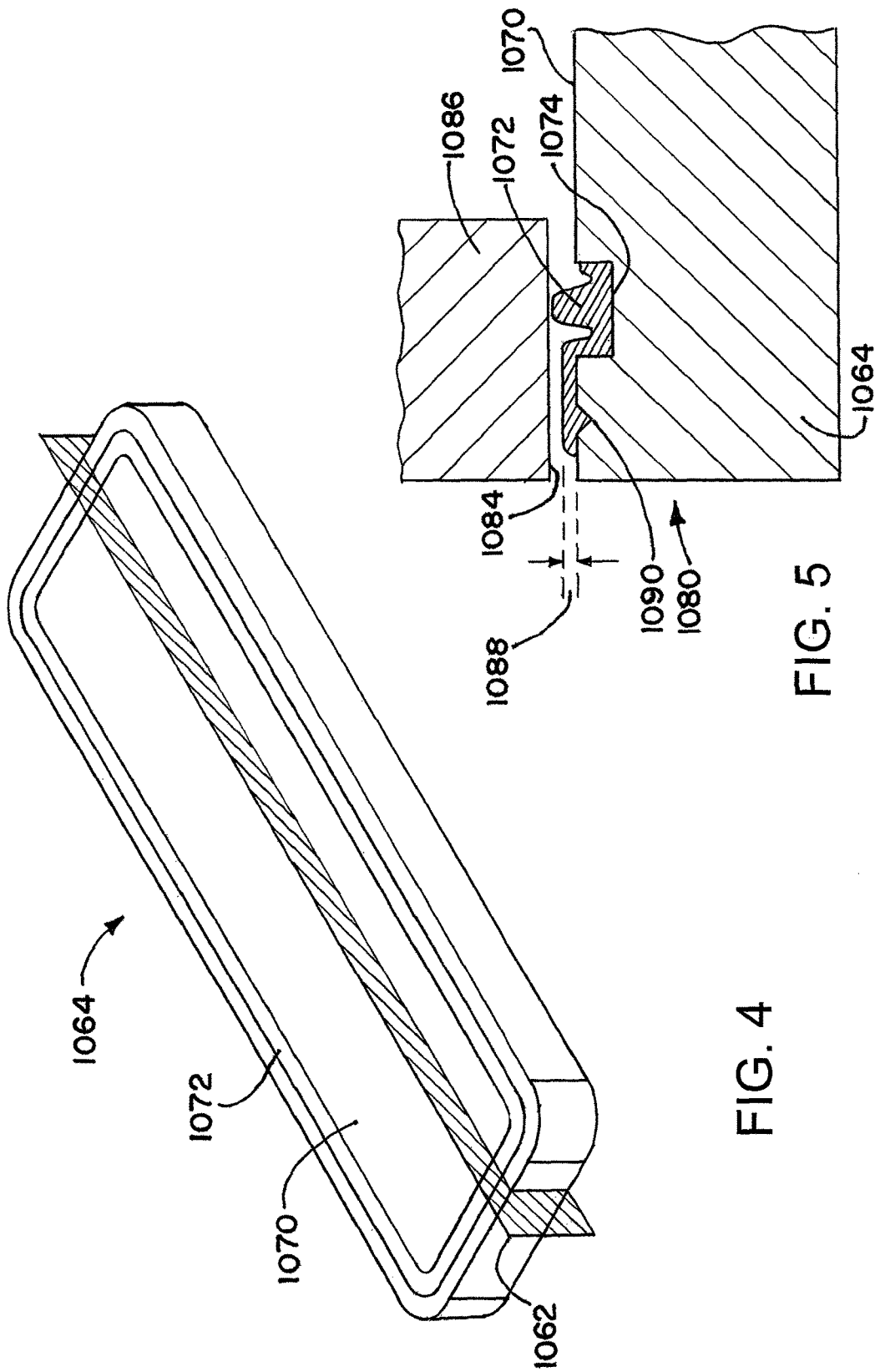

SLIT VALVE ASSEMBLY HAVING A SPACER FOR MAINTAINING A GAP

RELATED APPLICATION

This application is a continuation of U.S. Nonprovisional application Ser. No. 14/100,930 filed Dec. 9, 2013 which claims the benefit of U.S. Provisional Application No. 61/734,605 filed Dec. 7, 2012, which are hereby incorporated herein by reference.

FIELD OF INVENTION

The present invention relates generally to seal assemblies for valves and more particularly to slit valve door seal assemblies having particular use in forming a seal between chambers in vacuum equipment employed in the semiconductor industry for chip manufacture.

BACKGROUND

Vacuum systems for manufacturing integrated circuits on wafers are generally known. A vacuum processing system may typically have a centralized vacuum chamber, called a transfer chamber, which may be part of a mainframe, for transferring wafers from one process chamber or load lock chamber to the next. A vacuum processing system may also typically have some kind of subsystem, such as a mini-environment, for providing the wafers to the load locks and other chambers and for collecting them back in order to send them on to the next system for processing. This transfer chamber plus the peripheral chambers and staging areas are sometimes called a cluster tool.

Between two vacuum chambers, such as the transfer chamber and one of the process chambers, is a slit valve. The slit valve typically includes an elongated rectangular opening for providing physical access between the two vacuum chambers. For example, when the slit valve is open, a robot in the transfer chamber may retrieve a wafer from one vacuum chamber and insert it into another vacuum chamber using a long, thin blade to hold the wafer.

After the wafer has been inserted into a vacuum chamber, the slit valve may be closed and sealed with a slit valve door by, for example, a pneumatic actuator. The slit valve door usually forms an airtight seal for the slit valve so that the pressure differential between the two chambers will not cause a gas leak through the slit valve. A metal insert may be placed within the slit valve opening in order to form a better airtight seat for the slit valve door.

Slit valve doors have typically been made of metal and often include an O-ring or other resilient seal. However, since the seal between the O-ring and the slit valve is not static, but rather is constantly being opened and closed such that there is rubbing and abrading on the O-ring from the slit valve insert, some particle generation, typically from the O-ring, still may occur. Further, this rubbing and deforming of the O-ring shortens its life-span and may eventually result in metal-to-metal contact. The metal-to-metal contact between a slit valve door and the metal insert may create microscopic particles that scrape off of the metal and get into the otherwise relatively clean environment of the vacuum chambers. Such particles may land on the wafers in the chambers, thereby contaminating them. Such contamination is undesirable in the processing of wafers.

Therefore, another consideration when utilizing a resilient seal is controlling the size of the gap between the door and chamber to eliminate dynamic metal-to-metal scrubbing of the door and slit valve body and/or over-compression of the seal. Controlling the size of this gap can also protect the seal from excessive exposure to the harsh chemicals that may exist in the chamber. Typically, controlling the gap size has involved tedious adjustment of the door and/or calibration of the actuator.

Traditional slit valve doors utilizing a resilient seal, such as a vulcanized fluorocarbon seal or a perfluorinated O-ring, typically have relied on the clean dry air (CDA) pressure setting of the slit valve pneumatic actuator to control the size of the gap between the door and valve and, thus, the seal compression. Fatiguing of the O-ring or vulcanized seal through dynamic cycling of the slit valve door can result in plastic deformation of the elastomer which leads to inconsistent gapping between the slit valve door and the slit valve body (and/or insert). Inconsistent gapping can result in seal over-compression, metal-to-metal contact between the slit valve door and the slit valve body, high exposure levels of the sealing element to corrosive process gases, and premature degradation of the seal.

SUMMARY OF INVENTION

The present invention provides for the protection of a seal (using various techniques) from the harsh environment in which it is used. More particularly, the protection is accomplished using a combination of one or more devices in conjunction with a spacer for maintaining a gap between a slit valve door and a sealing surface of a slit valve body (or slit valve insert) to extend the life of the seal. The spacer can extend the life of a seal by limiting the line of sight exposure of the seal to corrosive gases within a wafer processing chamber and by reducing or preventing over-compression of the seal, thus preventing excess wear on the seal and reducing particulate matter from entering the process chamber. The spacer may be located on an outer ambient side of the slit valve away from any corrosive gasses that may exist in the chamber. The spacer may be attached to the slit valve door partially in a depression or channel therein, and may be integral with the seal or on the mating chamber or insert face. The spacer may be continuous around the seal perimeter or may be segmented. The spacer may be permanently bonded to or otherwise integrally bound to the seal door or mating face, or may be removable/separable.

Further, the present invention provides improvements to a standard slit valve assembly that enhance the effectiveness of the slit valve and the spacer.

One improvement may be providing the spacer on faces of a slit valve door that are not parallel with the face of the door containing the seal. This configuration allows, for instance, the seal to be contained in one oblique or skewed plane even when the axis of motion of the door is not perpendicular to the slit valve opening. Further, this configuration also prevents rubbing or abrading of the spacer by keeping the faces supporting the spacer perpendicular to the axis of motion.

Another improvement is incorporating a labyrinth between the gaseous chamber and the seal to reduce particle energy levels reaching the seal by increasing the path of travel of these radicals. The spacer prevents the labyrinth from rubbing or abrading by maintaining an appropriate gap and thus minimizes contamination in the processing chamber. The labyrinth may be formed by a tongue and groove in the door and valve body. The tongue may be formed by a removable insert set in a second groove opposite the first. The tongue and groove can be any appropriate shape, but in one embodiment are rectangular shapes.

A still further improvement is a recess in the slit valve door with sidewalls that continue the shape of the sidewalls in the gaseous chamber. This configuration directs the flow of plasma ions away from the sealing element. Further, this configuration promotes a laminar flow of gasses within the chamber, thus increasing chemistry reactivity and reducing gas usage due to increased efficiency. The recess may be a concave shape such as a hemisphere, or may form a partially enclosed pocket to help trap particles.

A final improvement is a barrier positioned between the seal and the processing chamber. The barrier helps prevent corrosive gasses from reaching the seal. Further, the spacer prevents wear on this barrier.

In accordance with one aspect of the present invention, a slit valve assembly comprises a slit valve body having a slit valve opening and a facing surface surrounding the slit valve opening; a slit valve door for use in a slit valve assembly moveable between open and closed positions to respectively permit and block flow through the slit valve opening, the slit valve door having a facing surface for sealing against the facing surface of the slit valve body; an actuation device that effectuates movement of the slit valve door; an annular seal disposed in a first groove in one of the facing surfaces and interposed therebetween to effectuate the sealing; and a spacer interposed between the facing surfaces for maintaining a minimum gap between the facing surfaces when the door is in a closed position; wherein the spacer is formed integral with the annular seal, extending radially outward therefrom and disposed at least partially in a second groove in the same one of the facing surfaces on the slit valve door or chamber/insert.

Further aspects include facing surfaces that are multi-plane facing surfaces wherein the multi-plane facing surfaces are substantially perpendicular to the flow through the slit valve opening. Still further, the actuation device may effectuate movement of the slit valve door along an axis of movement substantially perpendicular to the flow through the slit valve opening.

According to another aspect of the present invention, a slit valve assembly comprises a slit valve body having a slit valve opening and a facing surface surrounding the slit valve opening; a slit valve door for use in a slit valve assembly moveable between open and closed positions to respectively permit and block flow through the slit valve opening, the slit valve door having a facing surface for sealing against the facing surface of the slit valve body; an actuation device that effectuates movement of the slit valve door; an annular seal disposed in a groove in one of the facing surfaces and interposed therebetween to effectuate the sealing; and a spacer interposed between the facing surfaces for maintaining a minimum gap between the facing surfaces when the door is in a closed position; wherein the facing surfaces form interiorly of the seal a labyrinth between the facing surfaces for increasing the path length of plasma particles.

According to further aspects, the labyrinth comprises at least one groove on at least one of the facing surfaces and a mating tongue with substantially complimentary geometry to the at least one groove, wherein the mating tongue fits inside the groove when the slit valve door is in the closed position. The mating tongue and at least one groove are not in contact with each other during operation of the slit valve assembly. The mating tongue and the at least one groove have substantially rectangular cross-sections. The mating tongue is removably coupled to a groove on at least one of the facing surfaces. The slit valve assembly further includes an area of the slit valve door opposite the slit valve opening when the slit valve door is in the closed position is recessed. The facing surface surrounding the valve opening is a surface of a slit valve insert removably coupled to the slit valve body. The slit valve assembly further includes a barrier on at least one of the facing surfaces disposed between the seal and the slit valve opening at least when the slit valve door is in the closed position. The slit valve door is moveable along an axis for opening and closing the opening of the slit valve body, the annular seal resides on a facing surface in a plane oriented non-orthogonally to the axis, and the spacer is located transaxially outward from a relatively adjacent part of the annular seal and resides in one or more planes oriented substantially perpendicular to the axis.

According to another aspect of the present invention a slit valve assembly comprises a slit valve body having an opening surrounded by a facing surface and defined by sidewalls; a slit valve door moveable between open and closed positions to respectively permit and block flow through the opening of the slit valve body, the slit valve door having: a facing surface for movement in juxtaposition to and for sealing against the facing surface of the slit valve body, and a recess with sidewalls that form a tangential continuation of the corresponding sidewalls of the slit valve body, and whereby flow along the sidewalls of the body will continue past the sealed facing surfaces into the recess; and an actuation device that effectuates movement of the slit valve door.

Further aspects include a spacer for maintaining a minimum gap between the facing surfaces when the slit valve door is in the closed position. The slit valve assembly further includes an annular seal on at least one of the facing surfaces and a barrier on at least one of the facing surfaces disposed between the seal and the slit valve opening at least when the slit valve door is in the closed position. The slit valve assembly further includes a slit valve insert removably coupled to the slit valve body, wherein sidewalls of the slit valve insert are adjacent to and tangentially continue the geometry of the sidewalls of the slit valve body and tangentially continue the geometry of the sidewalls of the recess of the slit valve door when the slit valve door is in a closed position. The recess of the slit valve door and the sidewalls of the slit valve insert form a hemisphere. The recess is a concave surface. The recess is a pocket having a door opening adjacent to the slit valve opening when the door is in a closed position and a collision surface opposite the slit valve opening, wherein the collision surface has a greater extent than the door opening. The slit valve assembly further includes an annular seal on at least one of the facing surfaces; and a labyrinth formed by the facing surfaces when the slit valve door is in the closed position and disposed between the seal and the valve opening. The slit valve door is moveable along an axis for opening and closing the opening of the slit valve body, an annular seal resides on a facing surface in a plane oriented non-orthogonally to the axis, and the spacer is located transaxially outward from a relatively adjacent part of the annular seal and resides in one or more planes oriented substantially perpendicular to the axis.

According to another aspect of the present invention, a slit valve door moveable by an actuation device along an axis for opening and closing an opening of a slit valve body comprises: an annular seal residing on a facing surface in a plane oriented obliquely to the axis; one or more spacers located transaxially outward from a relatively adjacent part of the annular seal and residing in one or more planes oriented substantially perpendicular to the axis, wherein the one or more spacers are configured to maintain a minimum gap between the facing surface and a corresponding sealing surface.

Further aspects include the slit valve door being actuated using linear motion perpendicular to the flow of wafers into and out of a mating slit valve body. The slit valve door further includes a barrier on the facing surface disposed between the seal and a slit valve opening. The facing surface forms a labyrinth with a corresponding facing surface when the slit valve door is in a closed position.

According to another aspect of the present invention, a slit valve assembly comprises a slit valve body having a slit valve opening and a facing surface surrounding the slit valve opening; a slit valve door moveable between open and closed positions to respectively permit and block flow through the slit valve opening, the slit valve door having a facing surface juxtaposed the facing surface of the slit valve body; an actuation device that effectuates movement of the slit valve door; an annular seal on at least one of the facing surfaces that seals between the facing surfaces; a barrier on at least one of the facing surfaces and protruding therefrom, disposed between the seal and the slit valve opening at least when the slit valve door is in the closed position; and a spacer for maintaining a minimum gap between the facing surfaces, the spacer having a thickness sufficient to prevent compression or over compression of the barrier.

Still further aspects include the spacer having a thickness greater than or equal to the thickness of the barrier. The facing surfaces form a labyrinth between the seal and the slit valve opening. The slit valve assembly further includes an area of the slit valve door opposite the slit valve opening when the slit valve door is in the closed position is recessed. The facing surface surrounding the slit valve opening is a surface of a slit valve insert removably coupled to the slit valve body. The slit valve door is moveable along an axis for opening and closing the opening of the slit valve body, the annular seal resides on a facing surface in a plane oriented non-orthogonally to the axis, and the spacer is located transaxially outward from a relatively adjacent part of the annular seal and resides in one or more planes oriented substantially perpendicular to the axis.

The foregoing and other features of the invention are hereinafter described in greater detail with reference to the accompanying drawings.

BRIEF DESCRIPTION OF THE DRAWINGS

FIG. 4 is a perspective view of a seal plate having a seal and a spacer;

FIG. 5 is a partial cross-sectional view of a slit valve door and slit valve body, the slit valve door having a seal and a spacer;

DETAILED DESCRIPTION

Figure 1:
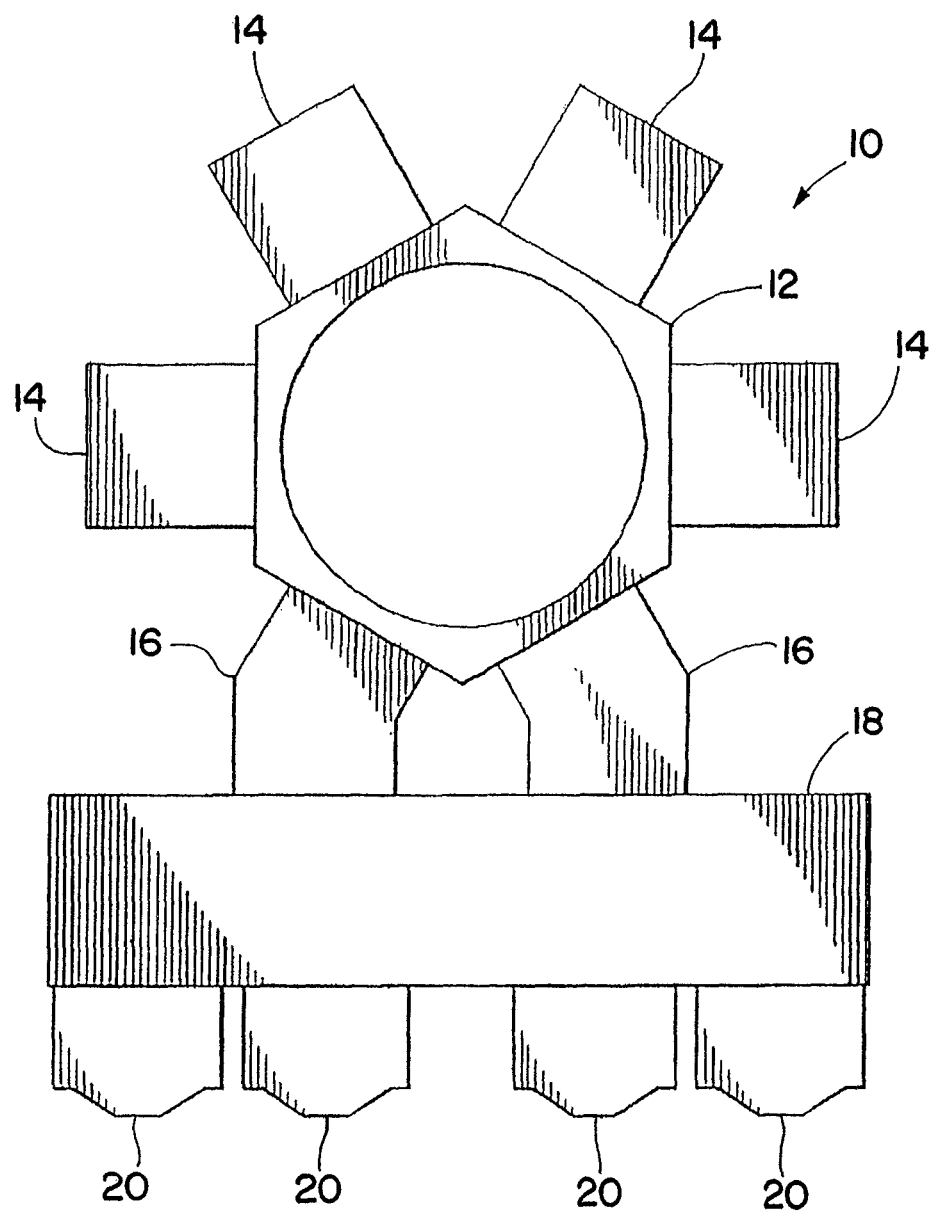
FIG. 1 is a top schematic view of a prior art vacuum system including a transfer chamber and a lid.

Throughout this disclosure, reference numerals are used to designate elements in the figures referred to in the text. Analogous elements between different embodiments use reference numerals incremented or decremented by multiples of 1000 in order to aid in understanding. Such elements may be functionally similar or equivalent to each other, and may share similar or identical physical geometry, but need not do so. Further, some elements common to two or more figures and described elsewhere in the text may be omitted from another figure and/or description for clarity and brevity, but it is understood that this disclosure contemplates that features from one embodiment may be present in another without being explicitly referred to in the text or shown in a figure.

Referring now in detail to the drawings and initially to FIG. 1, an exemplary prior art vacuum processing system is generally indicated at 10. The system 10 comprises a series of vacuum chambers 14 attached to a central vacuum transfer chamber 12. A pair of vacuum load lock chambers 16 provide a passageway to a mini-environment 18. Pod loaders 20 are shown attached to the mini-environment 18. This system is an example of a cluster tool.

The vacuum chambers 14 may be connected to the transfer chamber 12 at an airtight seal which permits wafers to pass between the chambers 12, 14 and 16 without losing the vacuum in the chambers. The pod loaders 20 are attached to the mini-environment 18 and may be loaded with wafer cassettes (wafer holders) by a person or by an automated machine that is part of the over-all automated manufacturing system of the manufacturing plant or building that houses the vacuum processing system 10. A robot (not shown) within the mini-environment 18 may move the wafers or cassettes from the pod loaders 20 to the load lock chambers 16 and back again. A robot (not shown) with an arm and a blade for moving wafers within transfer chamber 12 may move the wafers from one of the load lock chambers 16 to the process chambers 14 and back to one of the load lock chambers 16.

The vacuum chambers 14 may be any of several types of process chambers, such as a chemical vapor deposition (CVD) chamber, a physical vapor deposition (PVD) chamber, an etch chamber, or the like, for performing on a wafer some type of process (often one in a series of many processes) for manufacturing integrated circuits on wafers.

Figure 2:
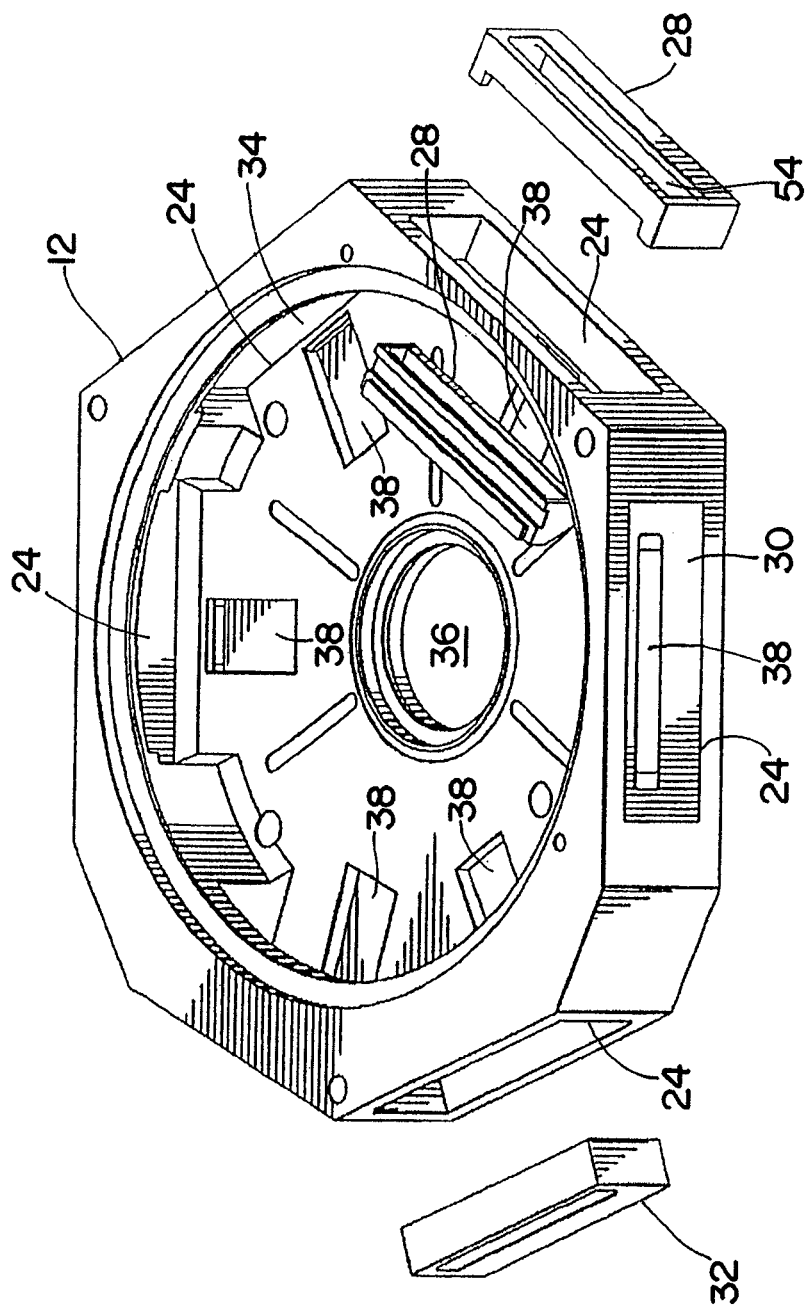
FIG. 2 is a perspective view of a transfer chamber with the lid off.
Figure 3:
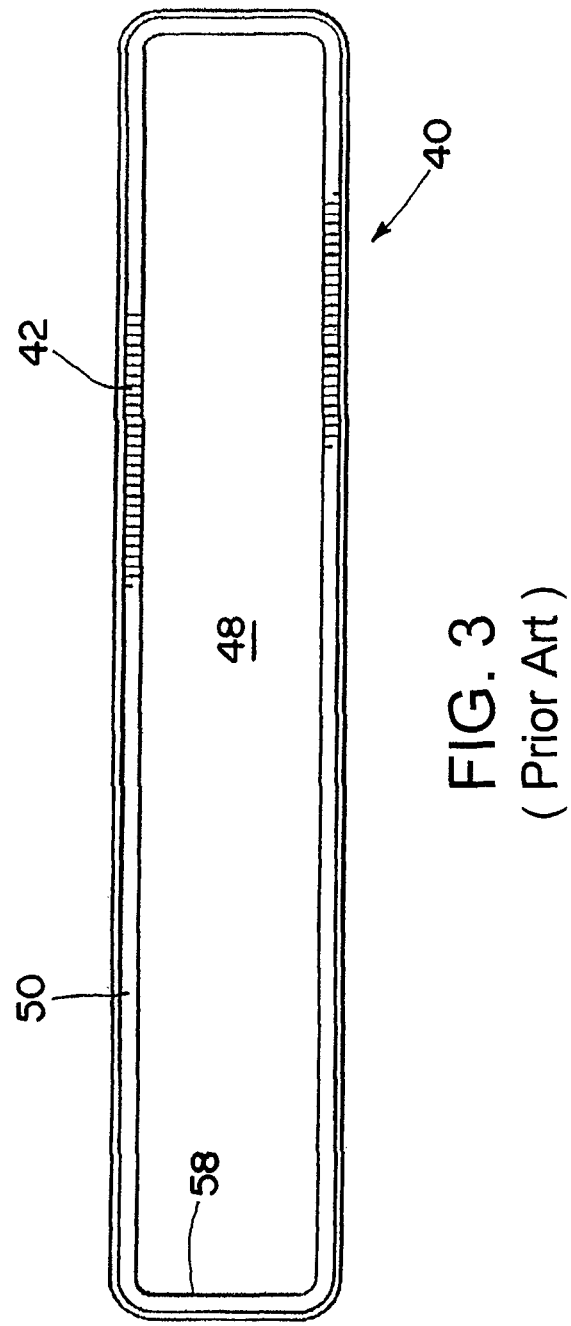
FIG. 3 is a plan view of the face of a seal plate.

In FIG. 2 an exemplary transfer chamber 12 is shown with its lid removed so that the interior of the transfer chamber 12 is visible. Several slit valves with openings 24 can be seen, as can slit valve inserts 28, 30, 32 and 34. Circular opening 36 supports a robot with an arm for moving wafers inside the transfer chamber 12, but the robot is not shown in this drawing so other details of the transfer chamber 12 may be visible. Openings 38 may provide access for an actuating cylinder for manipulating a slit valve door, the face of which is shown in FIG. 3. The actuating cylinder and the slit valve door are not shown so that other features in the transfer chamber 12 may be visible.

FIG. 3 shows the front face plate of the slit valve door 40. On facing surface 48 of seal plate 42 is seal 50 (for example, a molded-in-place seal) for contacting with a slit valve insert 28, 30, 32, 34, or a seat portion formed thereon. The seal may be any appropriate seal and may be formed and/or adhered in any conventional manner. For example, the seal 50 may be molded into a channel 58 formed around the periphery of facing surface 48. The seal may be vulcanized to the seal plate 42. Thus, in the manufacturing of seal plate 42, the seal 50 may be permanently attached to the seal plate 42. The seal 50 may be adhesively bonded to the metal surface of seal channel 58.

This type of slit valve door 40 may be actuated in a direction perpendicular to the plane in which its facing surface 48 is held by an actuating cylinder that protrudes out of opening 38. The seal 50 may match angular face 54 of the inner portion of insert 28. The actuating cylinder protruding out of opening 38 pushes slit valve door 40 up against slit valve insert 28 such that the molded-in-place seal 50 facing surface 54 making an airtight seal all around opening 56. Thus, when slit valve opening 24 is closed by slit valve door 40, the pressure in either the transfer chamber 12 or the process chamber 14 may change as needed without leakage between the two chambers.

Referring now to FIGS. 4 and 5, a slit valve door is designated generally by reference numeral 1064. The slit valve door 1064 includes facing surface 1070 which may house an annular seal 1072 that preferably is molded into an annular channel 1074 in the front face of the door. As used herein, an annular seal is one in which the seal surrounds or circumscribes an area, but need not be restricted to circular or ovular configurations. As shown in the Figs., for example, annular may refer to a closed square shape (preferably with rounded corners, for example). However, any closed shape is possible.

The molded-in-place seal 1072 may have a bottom contour that matches the contour of the channel 1074. As shown, the channel 1074 may have upwardly curving edges or sides that end almost vertical, or perpendicular, to facing surface 1070. The channel surface may have a suitable roughness to enhance the adhesion between the seal material and the channel.

The seal 1072 may be made of any suitable material that preferably does not generate many, if any, particles under the dynamic loading experienced by the seal, such as a variety of fluorocarbon and perfluoro elastomers that suit the requirements of wafer processing. Suitable seal materials are well known in the art. The seal 1072 may additionally or alternatively be bonded to the door 1064 by use of a suitable bonding agent. The seal 1072 may alternatively be bonded to a mating surface of a slit valve body 1086 or slit valve insert (not shown) without parting from the scope of the present invention.

Turning to FIG. 5, shown is a sectional view of slit valve door 1064 taken along the plane 1062 in FIG. 4, with a sectional view of a slit valve body 1086 taken from a similar plane. This slit valve assembly 1080 has a thin spacer or bumper 1082 in accordance with the invention. As used herein, "thin" refers to the thickness perpendicular to the sealing surface at a particular cross-section. "Thin" means thin relative to the thickness of the seal and/or to the width of the spacer, where the width is the cross-sectional width thereat (in an annular seal, for example, the width would not be the entire width of the spacer, but only the width on one side. For example, in a circular spacer, the width would be the outer radius minus the inner radius, while the thickness would be perpendicular thereto and perpendicular to the face thereat. The spacer may be, for example, a thin film such as a sprayed on coating. Alternatively, for example, the thin spacer may be of the same material as the seal and unitary therewith. The thin spacer 1082 is located between the facing surface 1070 of the slit valve door 1064 and a facing surface 1084 of a slit valve body 1086 for maintaining a gap 1088 therebetween. The thin spacer 1082 prevents the facing surfaces 1070 and 1084 from contacting each other, and operates to maintain the minimum distance therebetween without the need to precisely calibrate the actuator and/or adjust the slit valve door 1064 for such purpose. Thus, the actuator generally can be configured to apply a force adequate to compress the seal 1072 a desired amount without the need to account for potentially overcompressing the seal 1072.

The spacer 1082 may be polymeric in nature (elastomer or plastic) and/or have a surface coating of a low-friction, abrasion-resistant material that would not be a particle contaminant in process chamber. With this coating, the spacer bulk material could be metallic or polymeric.

The spacer 1082 also allows a much smaller gap 1088 to be achieved than would otherwise generally be possible. As will be appreciated, a smaller gap 1088 limits the line-of-sight exposure of the seal 1072 to the corrosive gaseous flow within the chamber, which can extend the life of the seal 1072. For example, the spacer may be incompressible or compressible but configured such that it limits the closing of the door without full or over-compression of the seal. Thus, the spacer, and not the pressure difference or the actuator, determines the gap between the door and valve body of the slit valve.

The spacer 1082 can be positioned on either side or both sides of the seal 1072. In the illustrated embodiment, the spacer 1082 is on the outer ambient non-process side of the seal 1072, opposite the inner chamber process side. This position minimizes spacer material degradation due to exposure to the corrosive gasses of the chamber. The spacer 1082 may or may not be attached to the slit valve door 1064, but in general it will be firmly secured thereto to reduce mechanically-abraded particle generation under the spacer 1082. Alternatively, the spacer 1082 may be adhesively adhered, coated or sprayed, or chemically joined to the slit valve door 1064. Preferably, the spacer 1082 may be situated in or bonded to a groove or channel 1090 in facing surface 1070 of the slit valve door 1064. This channel 1090 may be of any appropriate shape or size, but may preferably be shallower than the annular groove or channel 1074 of the seal 1072. The spacer may also be integral with the seal 1072 and extend outward therefrom into the channel 1090.

It will be appreciated that the seal 1072 may have any appropriate uncompressed cross-sectional shape, for example a circle or a parabolic shape as shown in FIG. 5. The seal 1072, however, would normally be compressed between the opposed/mating facing surface 1084 of the slit valve body 1086 and the facing surface 1070 of the door 1064. Thus, the configuration would be different than that schematically depicted in FIG. 5. For instance, the seal may undergo compression as described in U.S. Pat. No. 6,089, 543, which is hereby incorporated herein by reference.

The dimensions (e.g., width and thickness) of the spacer 1082 may be designed to accept maximum application loads from differential pressure forces and worst-case CDA pressure settings. At such maximum application loads, the spacer 1082 may be designed to yield virtually no deflection, allowing for consistent seal compression and gap 1088 control between the door 1064 and the slit valve body 1086 regardless of the spacer material's fatigue strength and thermal stability throughout numerous dynamic cycles and high temperature softening.

A thin film spacer 1082 may be used to minimize the gap 1088. The smaller gap 1088 limits the volume of corrosive gases that may attack the seal 1072 during the wafer processing cycle, which as mentioned can result in increased seal 1072 life. Further, because the spacer 1098 generally reduces or eliminates the extent to which the seal can be compressed, seal degradation do to overcompression can also be reduced or eliminated.

Figure 6:
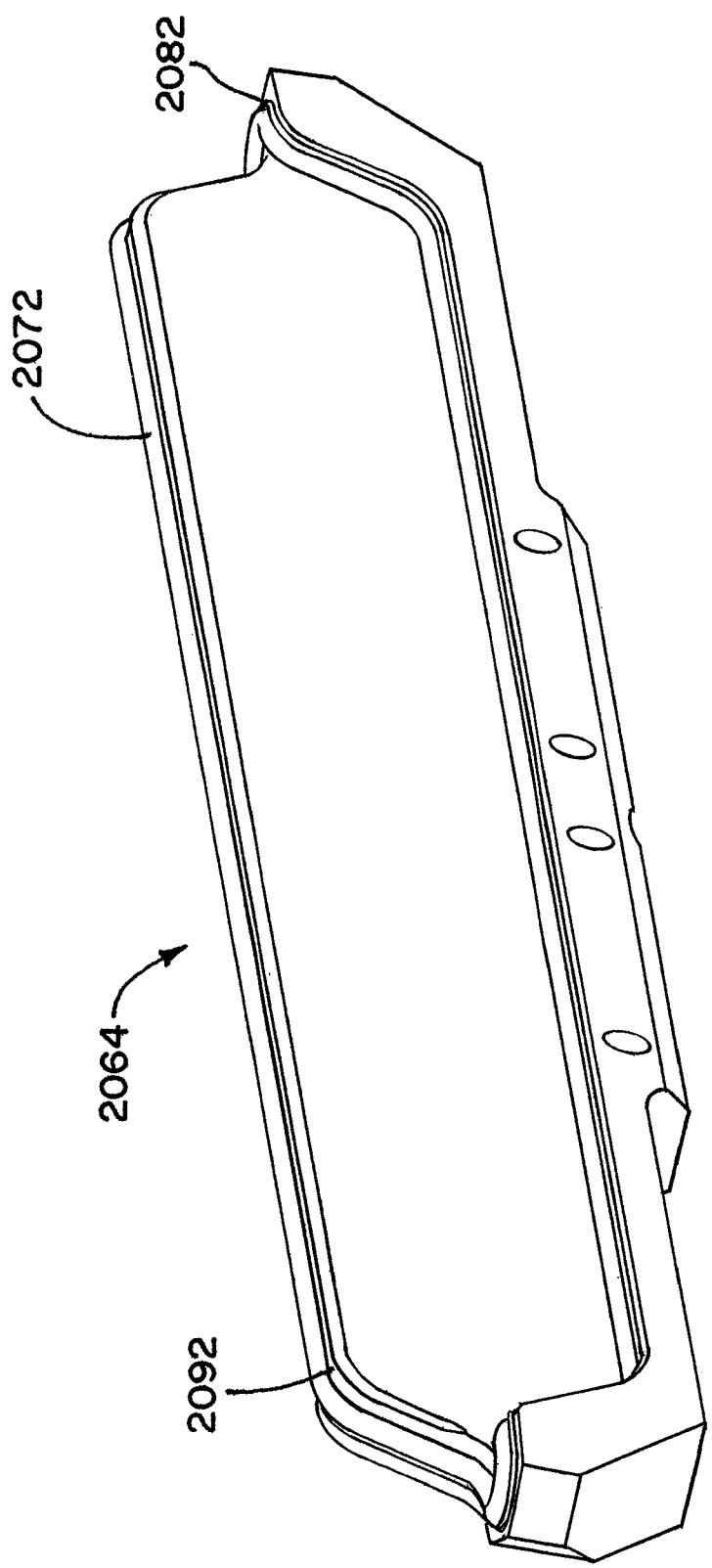
FIG. 6 is a perspective view of a multi-plane slit valve door.
Figure 7:
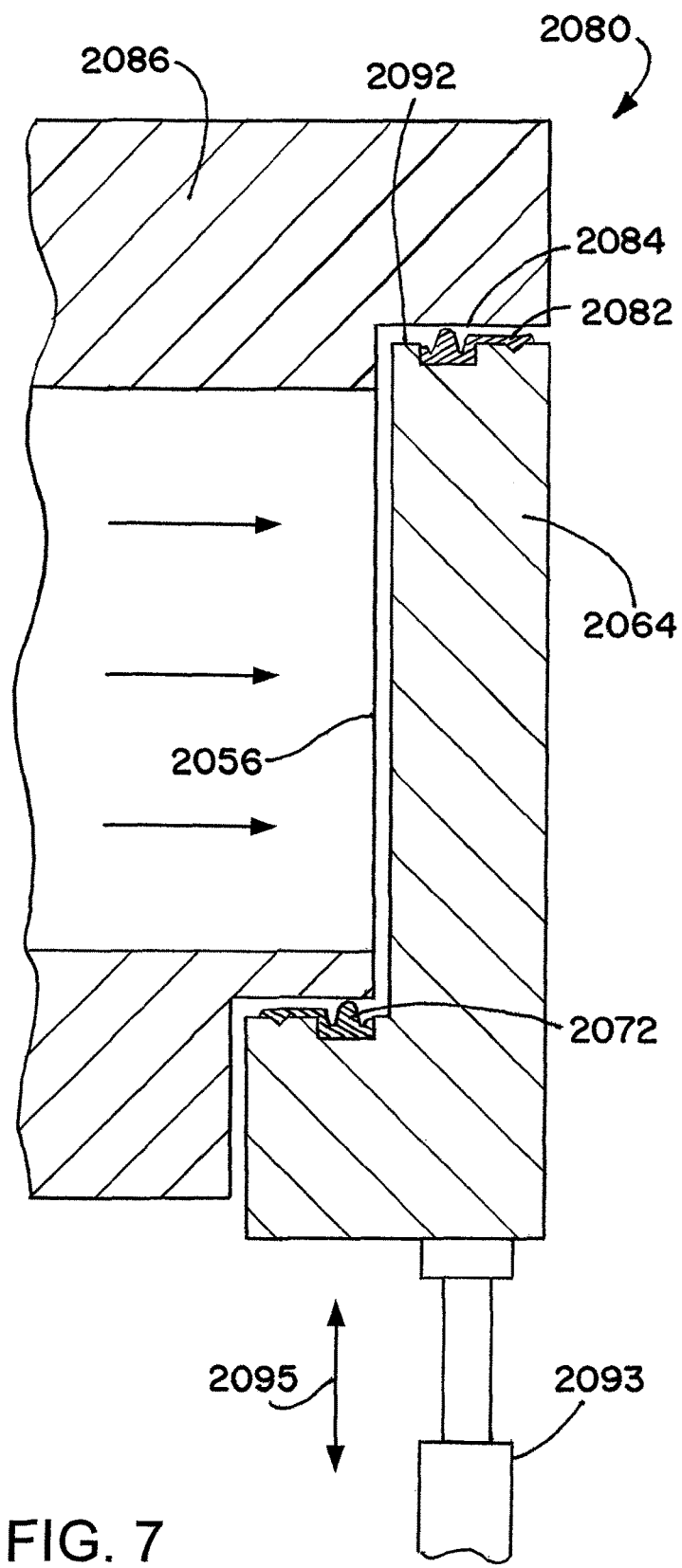
FIG. 7 is a cross-sectional view of a slit valve assembly having a multi-plane sealing surface.
Figure 8:
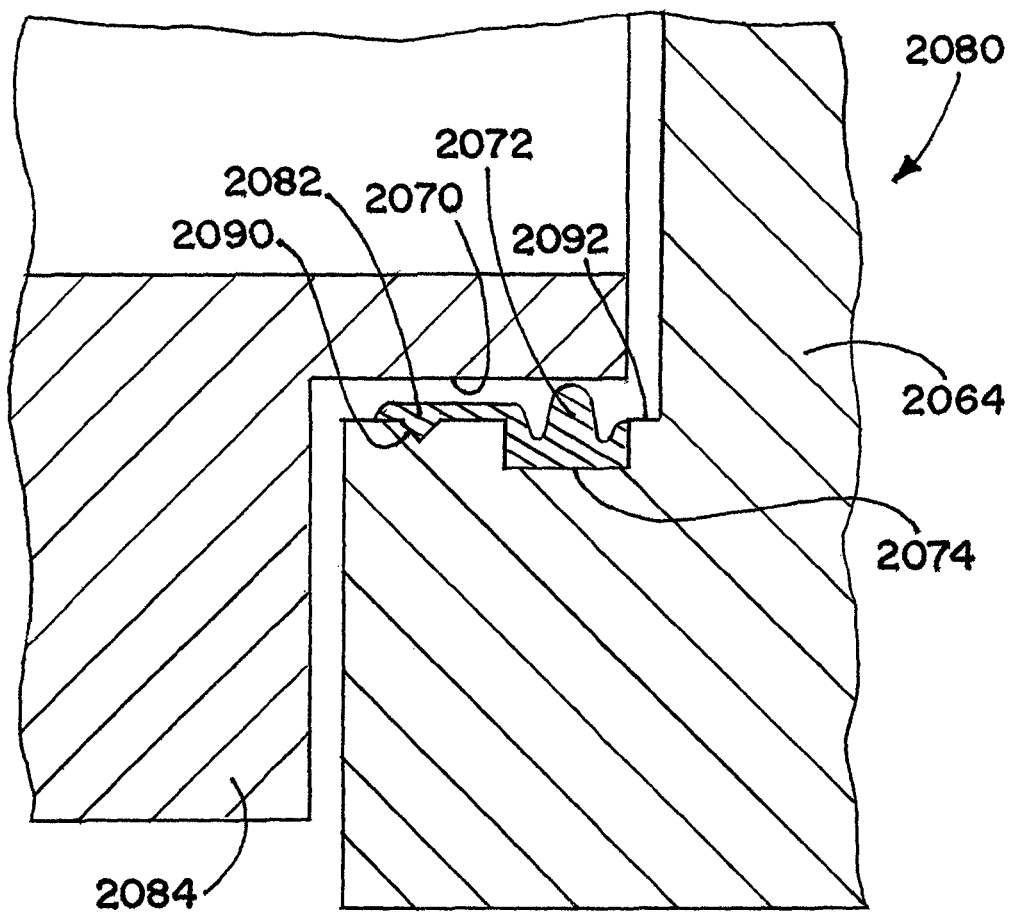
FIG. 8 is a is a detail cross-sectional view of a slit valve assembly having a multi-plane sealing surface.

Turning now to FIGS. 6-8, another exemplary slit valve assembly 2080 is illustrated. The slit valve assembly 2080 includes a slit valve door 2064 having a multi-plane facing surface 2092 for sealing against a corresponding facing surface 2084 of the slit valve body 2086. The multi-plane facing surface 2092 may include a seal 2072 molded into an annular channel 2074.

The multi-plane facing surfaces 2084, 2092 are substantially perpendicular to flow through the slit valve opening 2056 of the slit valve, and an actuation device 2093 effectuates movement of the slit valve door 2064 along an axis of movement 2095 substantially perpendicular to the flow through the slit valve opening 2056. This arrangement provides a seal turned ninety degrees from a more typical arrangement, while minimizing rubbing of the seal 2072 and spacer 2082 against the facing surface 2084, and allowing for a simple actuation device having to actuate along only one axis.

The seal 2072 is similar to the seals shown and described above. In addition, a spacer, such as spacer 2082 shown and described above, can be provided on the multi-plane sealing face 2092 adjacent the seal 2072. The spacer would operate in a similar manner to maintain a minimum gap 2088 between the facing surfaces 2092 and 2084.

Figure 9:
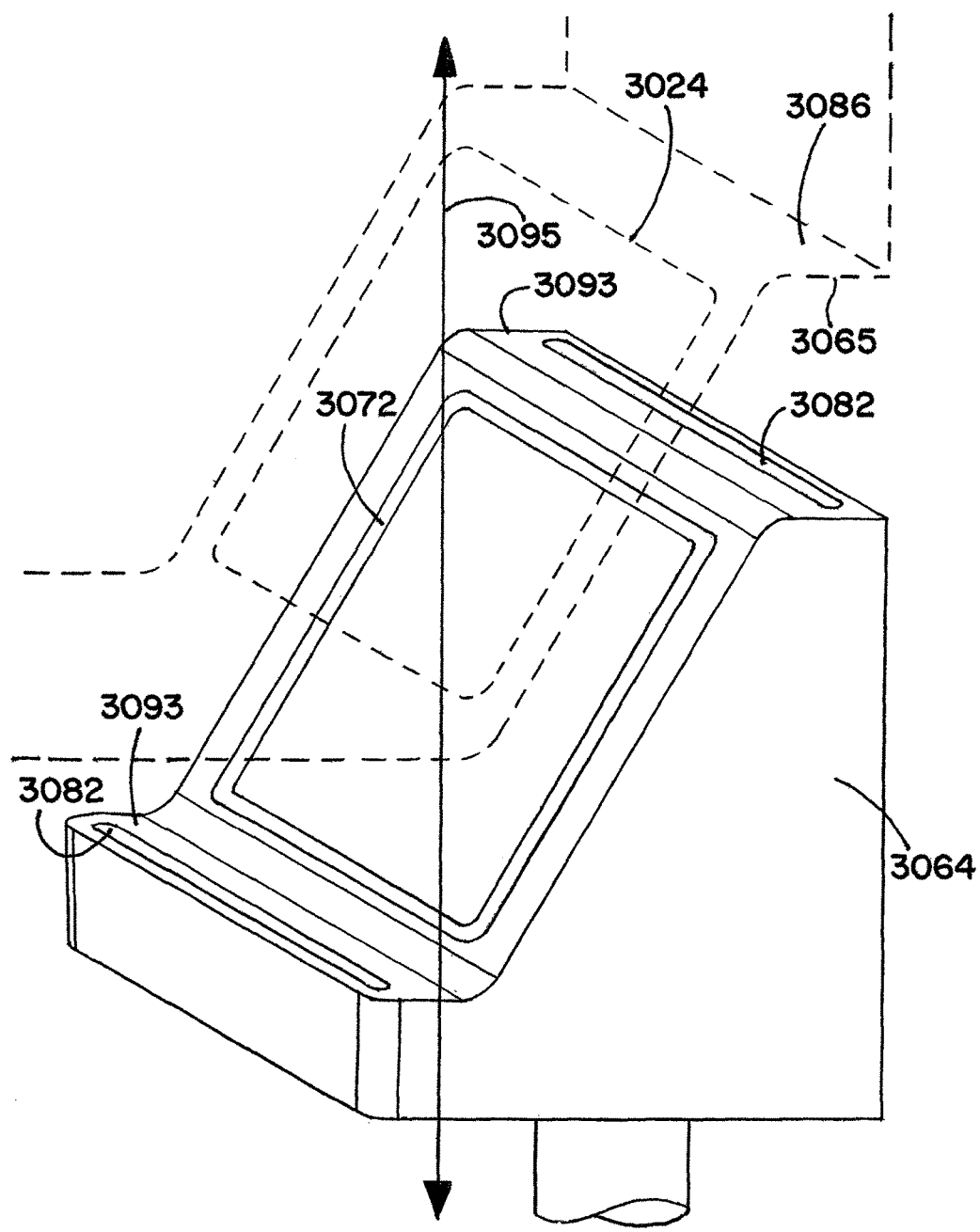
FIG. 9 is a is a perspective view of a skewed-plane slit valve door having separate spacer planes oriented substantially perpendicular to the axis of movement.

Referring now to FIG. 9, another exemplary slit valve door 3064 is illustrated. The slit valve door 3064 may have a single-plane skewed facing surface 3070 for sealing against a corresponding facing surface 3084 of the slit valve body 3086. The facing surface 3070 may include a seal 3072 molded into an annular channel 3074. The slit valve door 3064 may include one or more (preferably two) spacer faces 3093 substantially parallel to each other and perpendicular to the axis of motion 3095 of the slit valve door 3064. Spacers 3082 may be coupled to the spacer faces 3093 as described above. A slit valve door 3064 having this configuration allows for single-plane sealing while using simple linear motion (preferably vertical) that is perpendicular to the motion of a processing wafer. For example, a slit valve door 3064 may be lowered vertically downward and a processing wafer may be inserted horizontally into the process chamber through the opening 3024 in the slit valve body 3086, each shown in ghost lines in FIG. 9. These perpendicular motions may be more efficient than those known in the art while minimizing abrading of the seal 72 and spacers 82 by providing a single plane sealing face.

The spacers 3082 in the slit valve door 3064 shown in FIG. 9 may be designed to prevent deflection of the slit valve door 3064 when differential pressures of vacuum chambers change the loading forces on the slit valve door 3064. This design maintains an optimum gap 3088 for plasma resistance by the seal 3072, prevents relative seal 3072 movement that can increase particle contamination in the process chamber, and maintains sealing force to prevent gas leakage. The spacers 3082 may or may not be bonded to the slit valve door 3064, and may be located on the slit valve door 3064 or on a facing spacer surface 3065 on the slit valve body 3086 or slit valve insert (not shown).

Turning now to FIGS. 10A-10F, shown are embodiments of the present invention utilizing a labyrinth 4091 in conjunction with the spacer 4082. The labyrinth 4091 may be made integral (by stamping, machining, casting, or the like) to the facing surfaces 4070, 4084 and be composed of the same material thereof, or may be made of one or more inserts, as described below in reference to FIG. 11. The labyrinth 4091 may increase the path of travel a particle must take to reach the seal 4072 and any other degradable components of the slit valve assembly 4080, thus reducing particle energy levels. Further, the barrier 4082 may minimize or prevent material wear on the labyrinth 4091 by maintaining a proper gap 4088. This prevention of wear may also minimize or prevent particle contamination in the processing chamber from abraded materials of the labyrinth 4091. Although it may be used in any processing applications, the labyrinth 4091 is particularly well-suited for dry-etch applications.

Figure 10A:
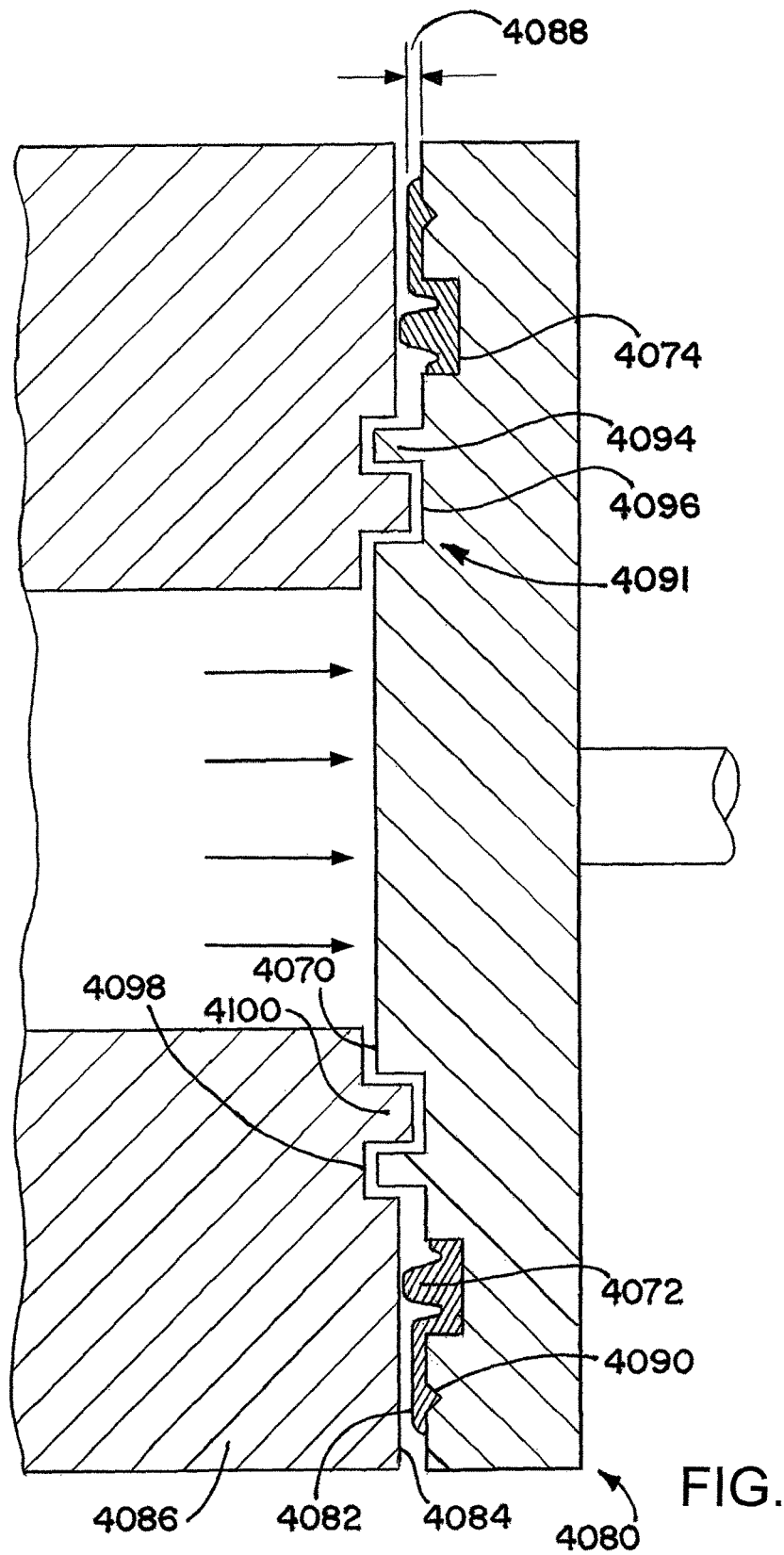
FIG. 10A is a cross-sectional view of a slit valve assembly including a labyrinth.
Figure 10B:
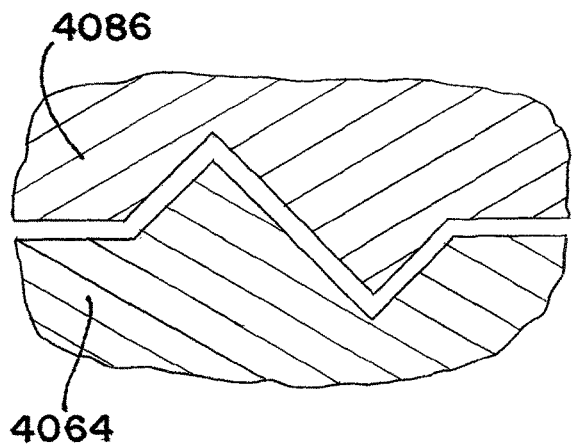
FIGS. 10B-10F are detail cross-sectional views of various examples of labyrinth geometries on a slit valve assembly.
Figure 10C:
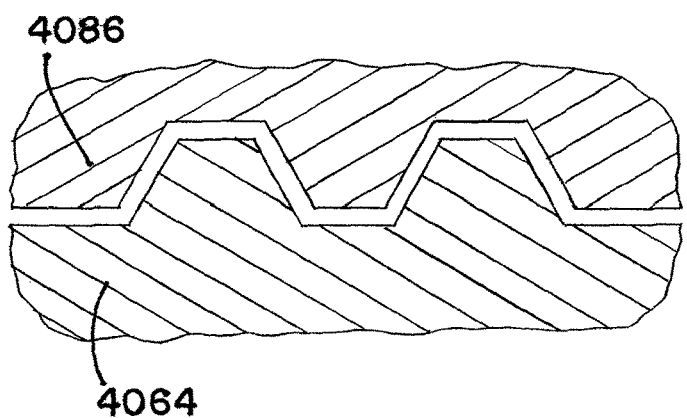
Figure 10D:
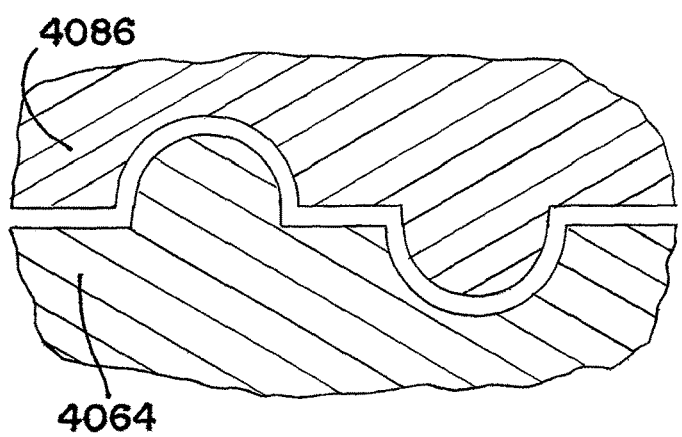
Figure 10E:
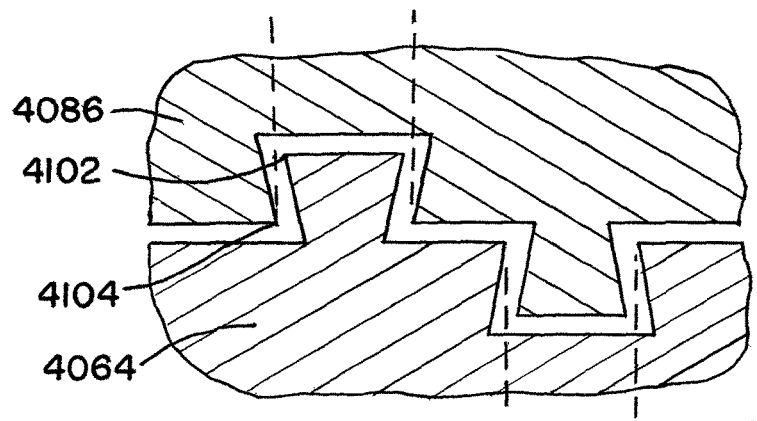

An example of the labyrinth 4091 is described herein: the facing surface 4070 of the slit valve door 4064 may be shaped with one or more tongues 4094 and/or grooves 4096 to increase the path a particle may take from the processing chamber to the seal 4072. The tongues 4094 and grooves 4096 of the facing surface 4070 of the slit valve door 4064 may be complimentary to and fit within or around grooves 4098 and tongues 4100 on the facing surface 4084 of the slit valve body 4086. These tongues 4094, 4100 and grooves 4096, 4098 may be any shape that is appropriate for their function, but in one preferred embodiment they are formed by angles approximately equal to ninety degrees as shown in FIG. 10A, thus producing a rectangular cross-section. The labyrinth 4091 may also contain triangular or trapezoidal shapes shown in FIGS. 10B and 10C. Rounded or curved shapes as shown in FIG. 10E are also possible.

Figure 10F:
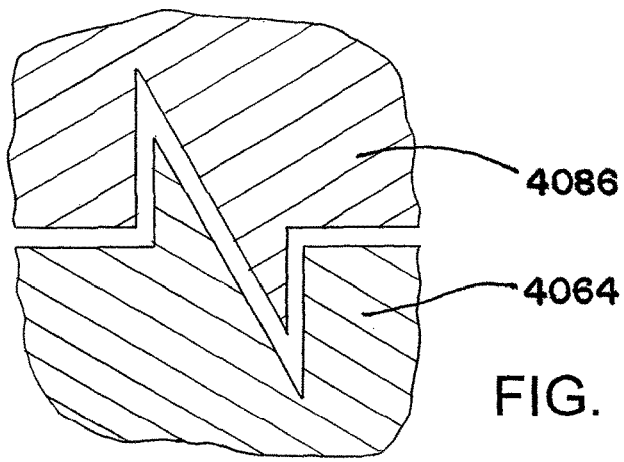

These shapes, however, only cause changes in particle direction of ninety degrees or less. It is possible to use a dovetail shape as shown in FIG. 10E in order to achieve path angles greater than ninety degrees. However, assuming a closing path for the slit valve door 4064 requires the tongue and groove to move past each other and further assuming that the tongue and groove are made of non-deformable materials, the outer tips 4102 of a tongue 4094, 4100 will need to be narrower than the inner tips 4104 of a mating groove 4096, 4098. Finally, the geometry of FIG. 10F is an exemplary geometry allowing for path angles greater than ninety degrees without the need to worry about an interference fit as with the dovetail configuration described above.

Figure 11:
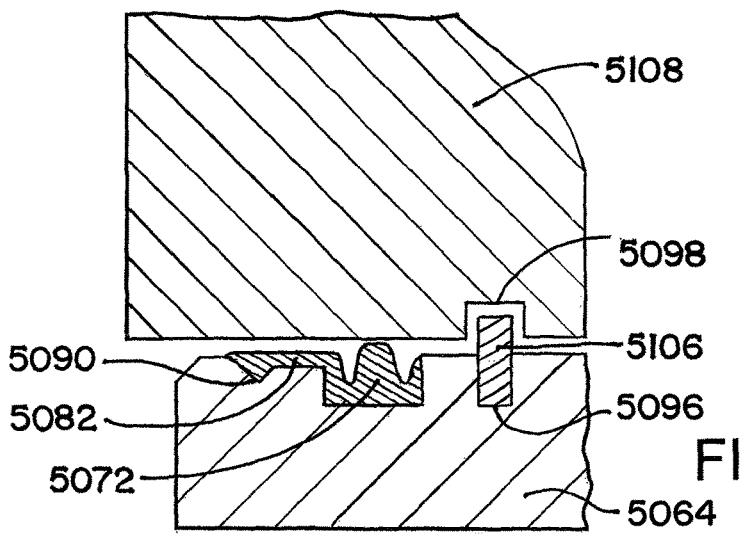
FIG. 11 is a detail cross-sectional view of a slit valve assembly having a labyrinth with a removable tenon insert.

Referring now to FIG. 11, the labyrinth 4091 described above may also be accomplished with an insert 5106. For example, a tongue 5094, 5100 on one of the facing surfaces 5070, 5084 may be formed by the combination of a groove 5096, 5098 and an insert 5106 inserted into this groove 5096, 5098. The insert 5106 may be shaped and sized to fit within a mating groove 5096, 5098 on the opposite facing surface 5070, 5084 when the door 5064 is in a closed position. The insert 5106 may be made of a plastic such as PTFE, a thermoplastic, a metal, or any other suitable material known in the art. The insert 5106 may be removable so that it may be replaced if it becomes degraded. The insert 5106 may reduce the cost and difficulty of manufacturing the labyrinth. Further, the replacement of an insert 5106 may be cheaper than the replacement of an entire slit valve door 5064 if the labyrinth became degraded. Finally, the groove 5098 may be formed in the slit valve body directly, or in a slit valve insert 5108 that attached to the slit valve body.

Figure 12:
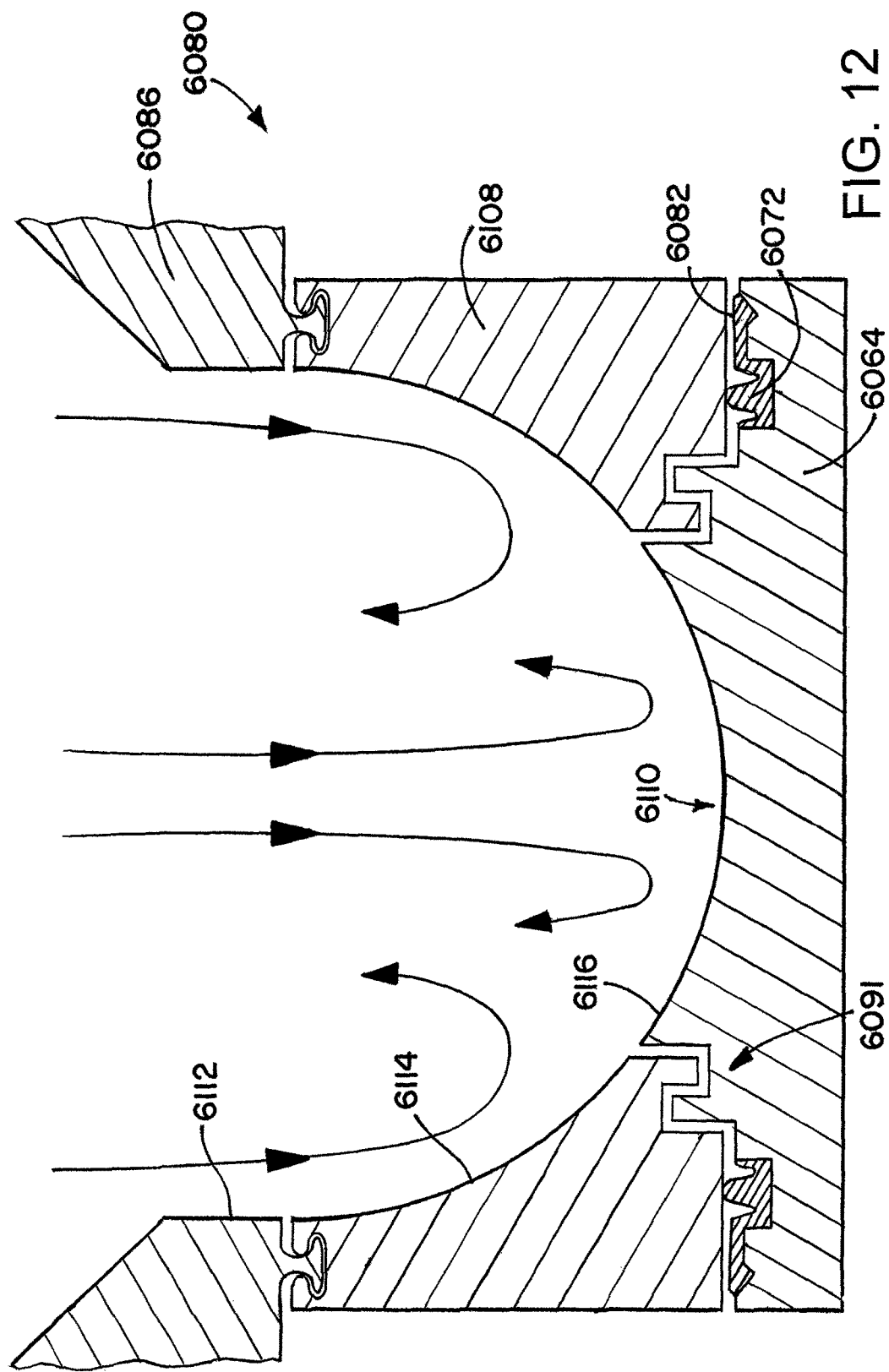
FIG. 12 is a cross-sectional view of a slit valve assembly including a slit valve insert and a slit valve door with a recess.

Turning now to FIG. 12, shown is an exemplary slit valve assembly 6080 incorporating the features of the spacer 6082 and labyrinth 6091 as described above. The slit valve door 6064 is mated with a slit valve insert 6108 that acts as a transition piece between the slit valve body 6086 and the slit valve door 6064. A slit valve insert 6108 may be used, for example, to utilize a slit valve door 6064 that was not necessarily manufactured to fit with an existing slit valve body 6086. Further, a slit valve insert 6108 may be used to prevent wear to a slit valve body 6086 by transitioning that wear onto the slit valve insert 6108 instead.

The slit valve door 6064 may form a recess 6110 as shown in FIG. 12. The recess 6110 may be formed so that sidewalls 6112 of the slit valve body 6086 or sidewalls 6114 of a slit valve insert 6108 tangentially continue the geometry of sidewalls 6116 of the recess 6110. For example, in FIG. 12, the sidewalls 6112 of the slit valve body 6086 are shown vertically parallel. The sidewalls 6114 of the slit valve insert 6108 form the beginning of a hemisphere, whose geometry is continued into the sidewalls of the slit valve door 6064. Thus, the sidewalls 6114, 6116 of the slit valve door 6064 and the slit valve insert 6108 may form a complete hemisphere that transitions into a tangential continuation with the sidewalls 6112 of the slit valve body 6086. (Although the recess is shown as a hemisphere, the recess need not be an exact half of a sphere, nor does it need to be any portion of a sphere. Rather, other recessed shapes are also possible.) Keeping the sidewalls 6112, 6114, 6116 tangential to one another may promote laminar flow of the gasses in the chamber. This laminar flow may increase the chemistry reactivity within the process chamber and thus reduce gas usage. Further, the geometry may also direct the flow of plasma ions away from the seal 6072, thus reducing seal 6072 degradation.

Figure 13:
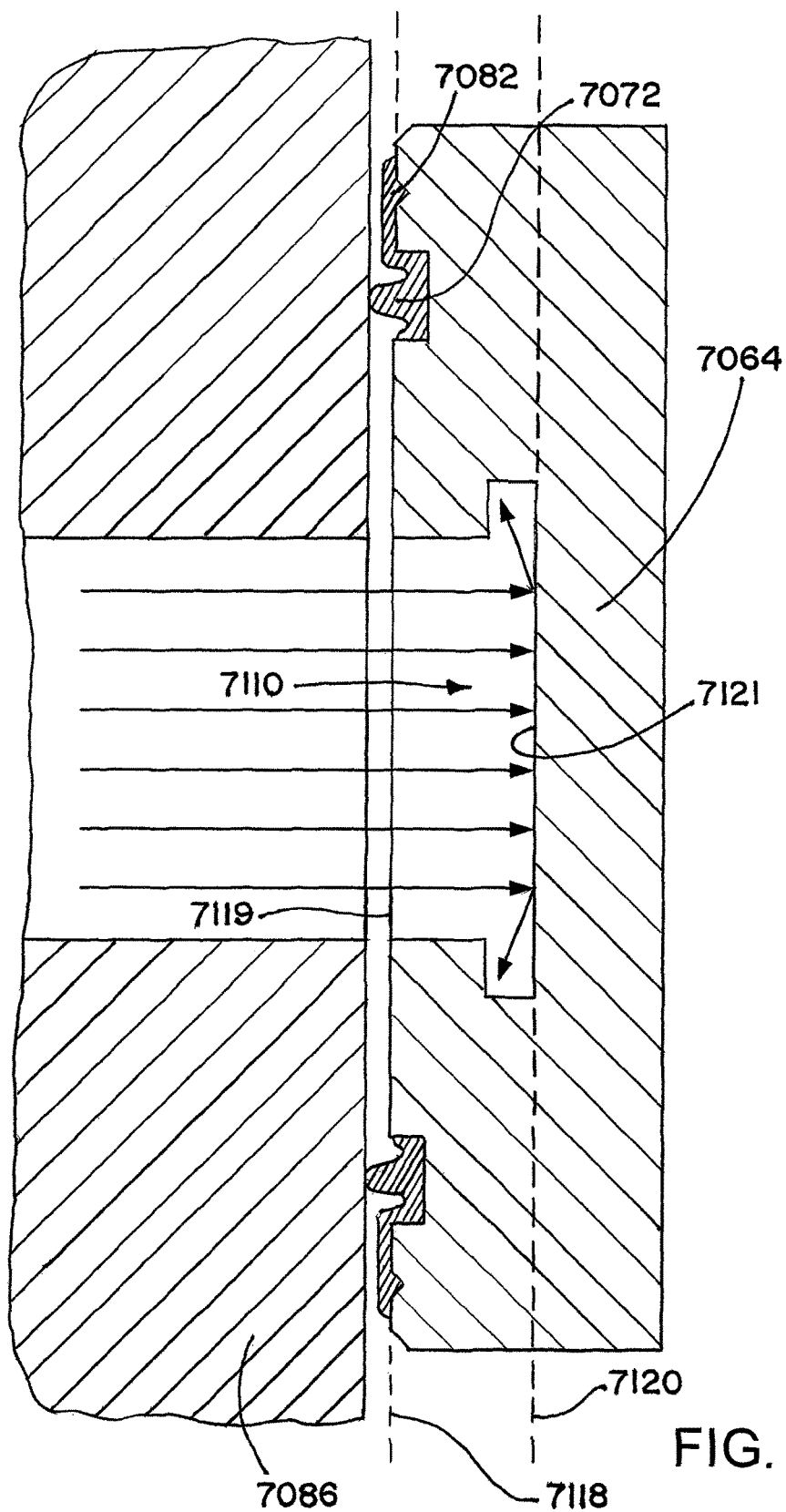
FIG. 13 is a cross-sectional view of a slit valve assembly including a slit valve door with a pocket-like recess.

In some embodiments, this recess 6110 may take the shape of a concave surface. In one preferred embodiment, the recess 6110 is a portion of a sphere. In another preferred embodiment, the recess 6110 may take the form of a hemisphere. As shown in FIG. 13, the recess 7110 may take the form of a partially enclosed pocket. In this embodiment, the collision surface 7121, located at the collision plane 7120, may have an extent that is greater than the door opening 7119, which may be located at the seal plane 7118. This pocket may reduce or eliminate plasma bombardment on the seal plane 7118, (the plane on which the seal 7072 is situated). By moving the collision plane 7120 away from the seal plane 7118, seal degradation may be decreased. Further, the pocket may trap or reduce the energy level of plasma that is caught in the partially enclosed areas.

Figure 14:
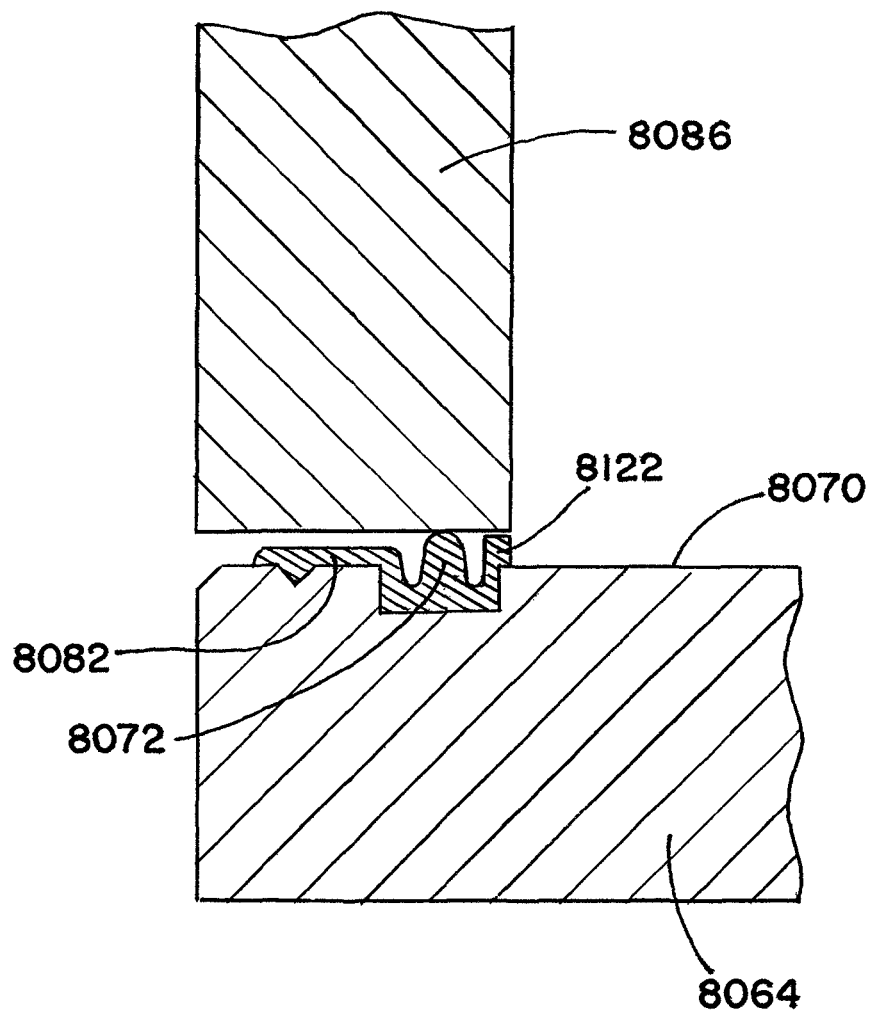
FIG. 14 is a cross-sectional view of a slit valve assembly including a seal, a spacer and a barrier.

Referring now to FIG. 14, shown is a detail view of another exemplary slit valve assembly 8080. In this embodiment, additional barrier material 8122 adjacent the seal 8072 is provided for blocking exposure of the seal 8072 to the corrosive chemicals in the chamber when the valve is closed. The seal 8072 and barrier material 8122 may be formed as a unitary piece as illustrated, or the barrier material 8122 may be formed separately and bonded to the facing surface 8070 or located within a channel (not shown) formed in the facing surface 8070. The barrier elastomeric material 8122 generally extends above the facing surface 8070 of the door 8064 and may be disposed on both the ambient and chamber sides of the seal 8072, but may also be provided only on one side of the seal 8072, such as the chamber side, for example.

The barrier material 8122 on the chamber side typically can be subject to degradation due to exposure to the corrosive gasses of the chamber. As will be appreciated, however, since the barrier material 8122 may be non-functional with respect to performing a sealing function, any such degradation typically will not impact the ability of the slit valve door 8064 to seal properly. Thus, by blocking exposure of the seal 8072 to chemicals in the chamber, the barrier material 8122 can extend the life of the seal 8072. The barrier material 8122 may be made of any appropriate material known in the art, but is preferably PTFE, PFA, or any similar plasma-resistant material.

When used in conjunction with the spacer 8082, the barrier 8122 becomes more effective. The spacer 8082 may prevent excess wear on the barrier 8122 by providing a minimum gap 8088. This gap 8088 may minimize or prevent abrading and mechanical deformation of the barrier 8122, extending its life and preventing particle contamination in the processing chamber. Although the barrier 8122 and spacer 8082 may be of any relative thickness, the thickness of the spacer 8082 is preferably greater than or equal to the thickness of the barrier 8122, in order to minimize wear on the barrier 8122.

It will be appreciated that throughout this disclosure, although the spacer, the seal, and the barrier have been shown and described as attached to the slit valve door, they could also be provided on a slit valve facing surface (e.g., on the facing surface of the slit valve body or the slit valve insert, if present) without departing from the scope of the invention. Further, aspects of the invention can be applied to any type of slit valve as well as other valve types wherein maintaining a minimum gap between mating sealing surfaces is desired. Still further, any of the aspects of the present invention may be combined with other aspects to provide still further benefits. For example, providing a labyrinth interior to a barrier may lower the energy of particles reaching the barrier, thus extending the life of the barrier.

Further, the use of the term "ambient side" in the above description generally refers to the side of the seal opposite any corrosive gasses (e.g., the "process side"). Accordingly, the ambient side may be open to the atmosphere, or may be exposed to another chamber that contains gasses that are at least somewhat less corrosive than the gasses on the opposite side of the seal. In some applications there may not be an ambient side of the seal. This can be the case, for example, if both sides of the seal have corrosive gasses.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A slit valve assembly comprising:
a slit valve body having a slit valve opening and a facing surface surrounding the slit valve opening;
a slit valve door for use in a slit valve assembly moveable between open and closed positions to respectively permit and block flow through the slit valve opening, the slit valve door having a facing surface for sealing against the facing surface of the slit valve body;
an actuation device that effectuates movement of the slit valve door;
an annular seal disposed in a first groove in one of the facing surface of the slit valve body and the facing surface of the slit valve door, and interposed between the facing surface of the slit valve body and the facing surface of the slit valve door to effectuate the sealing; and
a spacer interposed between the facing surface of the slit valve body and the facing surface of the slit valve door for maintaining a minimum gap between the facing surface of the slit valve body and the facing surface of the slit valve door when the door is in a closed position;
wherein the spacer is formed integral with the annular seal, extending radially outward therefrom and disposed at least partially in a second groove in said one of the facing surface of the slit valve body and the facing surface of the slit valve door; and
wherein the annular seal is made of a first material and the spacer is made of second material having relatively less elasticity than the first material; and
wherein the first and second grooves are radially separated by a land having a radially inner side surface forming a radially outer side of the first groove and a radially outer side surface forming a radially inner side of the second groove, and wherein the land has a relatively planar surface between the radially inner side surface and the radially outer side surface.

2. The slit valve assembly of claim 1, wherein the facing surface of the slit valve body and the facing surface of the slit valve door are multi-plane facing surfaces wherein the multi-plane facing surfaces are substantially perpendicular to the flow through the slit valve opening, and the actuation device effectuates movement of the slit valve door along an axis of movement substantially perpendicular to the flow through the slit valve opening.

3. The slit valve assembly of claim 1, wherein an area of the slit valve door opposite the slit valve opening when the slit valve door is in the closed position is recessed.

4. The slit valve assembly of claim 1, wherein the facing surface of the slit valve body surrounding the valve opening is a surface of a slit valve insert removably coupled to the slit valve body.

5. The slit valve assembly of claim 1, wherein the slit valve door is moveable along an axis for opening and closing the opening of the slit valve body, the annular seal resides in a plane oriented non-orthogonally to the axis, and the spacer is located transaxially outward from a relatively adjacent part of the annular seal and resides in one or more planes oriented substantially perpendicular to the axis.

6. The slit valve assembly of claim 1, wherein the second groove has a depth shallower than that of the first groove.

7. The slit valve assembly of claim 6, wherein said one of the facing surface of the slit valve body and the facing surface of the slit valve door has planar portions disposed inwardly and outwardly adjacent the annular seal and spacer, and the land is recessed relative to the planar portions.

8. The slit valve assembly of claim 7, wherein the planar portions are coplanar.

9. The slit valve assembly of claim 1, wherein the facing surface of the slit valve body and the facing surface of the slit valve door form interiorly of the annular seal a labyrinth between the facing surface of the slit valve body and the facing surface of the slit valve door for increasing a path length of plasma particles.

10. The slit valve assembly of claim 9, wherein the labyrinth comprises at least one groove on at least one of the facing surface of the slit valve body and the facing surface of the slit valve door and a mating tongue with substantially complimentary geometry to the at least one groove, wherein the mating tongue fits inside the at least one groove when the slit valve door is in the closed position.

11. The slit valve assembly of claim 10, wherein the mating tongue and at least one groove are not in contact with each other during operation of the slit valve assembly.

12. The slit valve assembly of claim 10, wherein the mating tongue and the at least one groove have substantially rectangular cross-sections.

13. The slit valve assembly of claim 10, wherein the mating tongue is removably coupled to a groove on at least one of the facing surface of the slit valve body and the facing surface of the slit valve door.

14. A slit valve assembly comprising:
a slit valve body having a slit valve opening and a facing surface surrounding the slit valve opening;
a slit valve door for use in a slit valve assembly moveable between open and closed positions to respectively permit and block flow through the slit valve opening, the slit valve door having a facing surface for sealing against the facing surface of the slit valve body;
an actuation device that effectuates movement of the slit valve door;
an annular seal disposed in a first groove in one of the facing surface of the slit valve body and the facing surface of the slit valve door, and interposed between the facing surface of the slit valve body and the facing surface of the slit valve door to effectuate the sealing; and
a spacer interposed between the facing surface of the slit valve body and the facing surface of the slit valve door for maintaining a minimum gap between the facing surface of the slit valve body and the facing surface of the slit valve door when the door is in a closed position;
wherein the spacer is formed integral with the annular seal, extending radially outward therefrom and disposed at least partially in a second groove in said one of the facing surface of the slit valve body and the facing surface of the slit valve door;
wherein the first groove is formed in a planar surface portion of said one of the facing surface of the slit valve body and the facing surface of the slit valve door, and the first groove at a side thereof opposite the second groove is defined by a wall surface that extends to the planar surface portion; and
wherein the first and second grooves are radially separated by a land having a radially inner side surface forming a radially outer side of the first groove and a radially outer side surface forming a radially inner side of the second groove, and wherein the and has a relatively planar surface between the radially inner side surface and the radially outer side surface.

15. The slit valve assembly of claim 14, wherein the land is recessed relative to the planar surface portion.

16. The slit valve assembly of claim 15, wherein the second groove has a depth shallower than that of the first groove.

17. A slit valve assembly comprising:
- a slit valve body having a slit valve opening and a facing surface surrounding the slit valve opening;
- a slit valve door for use in a slit valve assembly moveable between open and closed positions to respectively permit and block flow through the slit valve opening, the slit valve door having a facing surface for sealing against the facing surface of the slit valve body;
- an actuation device that effectuates movement of the slit valve door;
- an annular seal disposed in a first groove in one of the facing surface of the slit valve body and the facing surface of the slit valve door, and interposed between the facing surface of the slit valve body and the facing surface of the slit valve door to effectuate the sealing; and
- a spacer interposed between the facing surface of the slit valve body and the facing surface of the slit valve door for maintaining a minimum gap between the facing surface of the slit valve body and the facing surface of the slit valve door when the door is in a closed position;
- wherein the spacer is formed integral with the annular seal, extending radially outward therefrom and disposed at least partially in a second groove in said one of the facing surface of the slit valve body and the facing surface of the slit valve door;
- wherein the first groove is radially outwardly spaced apart from a side wall of the slit valve body or the slit valve door in which the first groove is formed; and
- wherein the first and second grooves are radially separated by a land having a radially inner side surface forming a radially outer side of the first groove and a radially outer side surface forming a radially inner side of the second groove, and wherein the land has a relatively planar surface between the radially inner side surface and the radially outer side surface.

18. The slit valve assembly of claim 17, wherein the second groove has a depth shallower than that of the first groove.

19. The slit valve assembly of claim 18, wherein said one of the facing surface of the slit valve body and the facing surface of the slit valve door has planar portions disposed radially inwardly and outwardly adjacent the annular seal and spacer, and the land is recessed relative to the planar portions.

20. The slit valve assembly of claim 19, wherein the planar portions are coplanar.

* * * * *